Sept. 2, 1924. 1,507,204
A. H. WILLOUGHBY ET AL
BATTERY CHARGING GENERATOR AND SAFETY CONTROLLER
Filed June 27, 1922 3 Sheets-Sheet 1
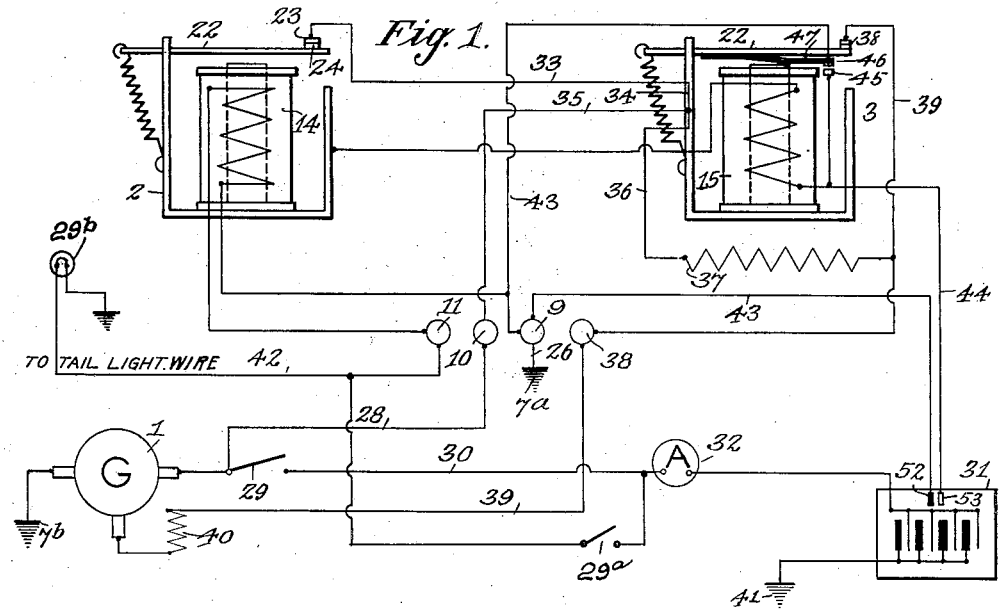
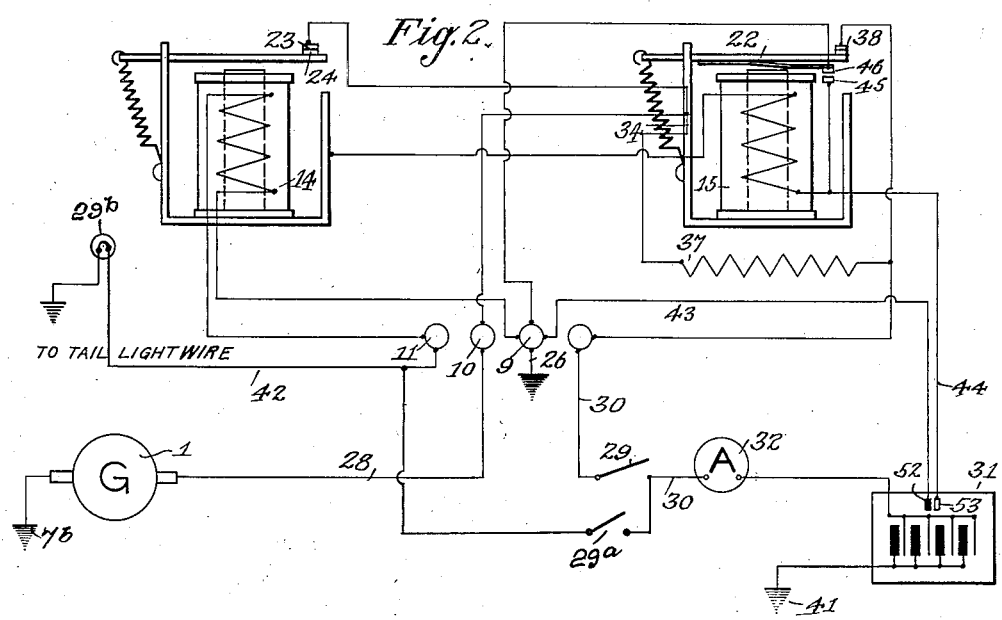
A. H. Willoughby and Geo. E. Roche
INVENTOR.
BY Geo. P. Kimmel
ATTORNEY.

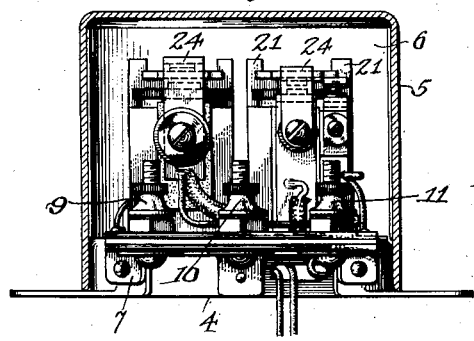
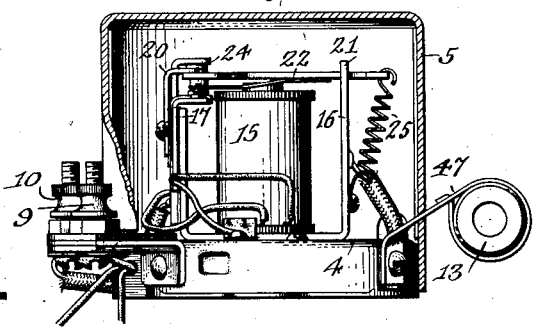
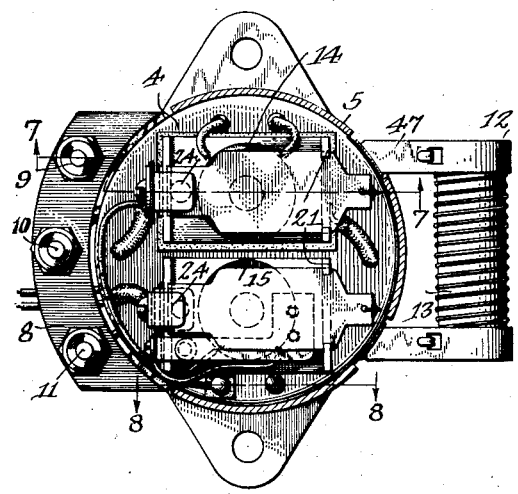
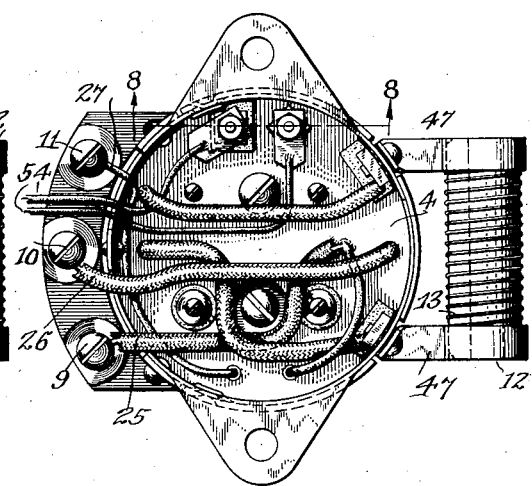
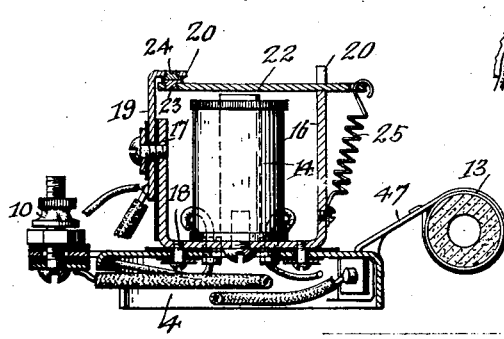
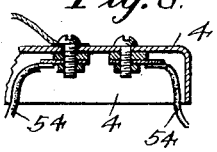

Sept. 2, 1924.  1,507,204
A. H. WILLOUGHBY ET AL
BATTERY CHARGING GENERATOR AND SAFETY CONTROLLER
Filed June 27, 1922   3 Sheets-Sheet 3
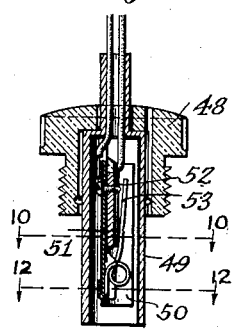
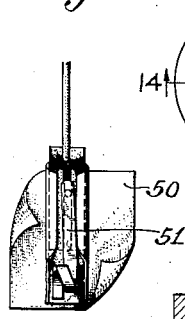
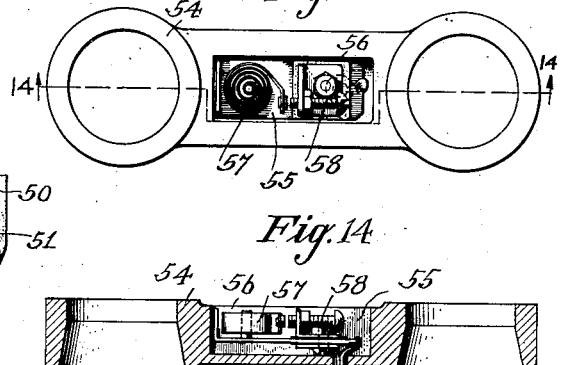
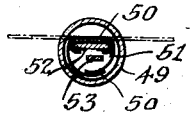
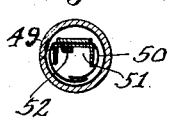
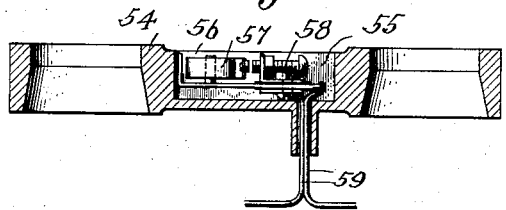
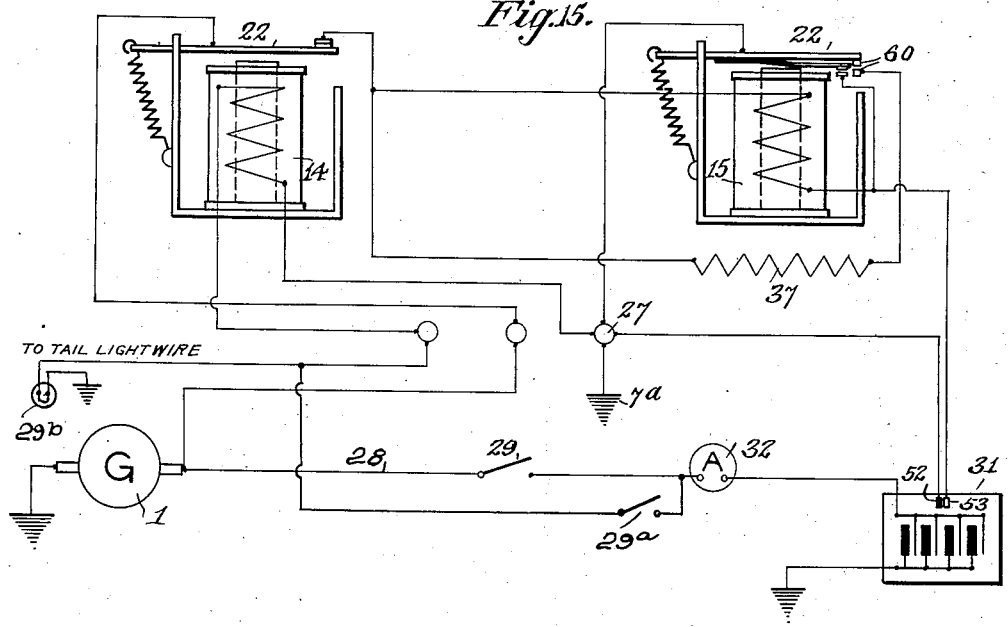
A. H. Willoughby and Geo. E. Roche,
INVENTOR.
BY Geo. F. Kimmel
ATTORNEY.

Patented Sept. 2, 1924.

1,507,204

UNITED STATES PATENT OFFICE.

ALFRED H. WILLOUGHBY AND GEORGE E. ROCHE, OF PORTLAND, OREGON.

BATTERY-CHARGING GENERATOR AND SAFETY CONTROLLER.

Application filed June 27, 1922. Serial No. 571,177.

*To all whom it may concern:*

Be it known that we, ALFRED H. WILLOUGHBY and GEORGE E. ROCHE, citizens of the United States, residing at Portland, in the county of Multnomah and State of Oregon, have invented certain new and useful Improvements in Battery-Charging Generators and Safety Controllers, of which the following is a specification.

This invention has reference to battery-charging generator and automatic battery safety controller and it comprises adjuncts to the generator and controller consisting of an electro-magnetic circuit breaker and automatic electro-magnetic switch, together with thermostats, which, when the battery reaches a certain temperature, when being charged, break the charging circuit and prevents overcharging.

In a great majority of batteries on autos, trucks, motorboats, etc., in cases up to ninety per cent, such batteries have their life shortened by overcharging, and the attendant injury caused by such overcharging, greatly increases the cost of the batteries to the customer.

Heretofore devices to prevent overcharging were governed absolutely by voltage or a carbon-pile resistance regulated by hand whenever the heat of the battery indicated overcharging.

Voltage regulation is in practice entirely too delicate to be practical, for the voltage of the storage battery between the condition of being half charged and the condition of being fully charged is only about two-tenths of a volt.

A storage battery in a healthy condition, on being fully charged, heats, as energy in the form of current passes through it and the excessive current is thrown off in the form of heat so that overcharging of the battery means nothing more or less than overheating, whether the battery receives a high continuous charging rate over a period of several hours or has been inactive for a period long enough to allow the plates to sulphate, regardless of the condition of the charge in the battery or where the battery has been allowed to run low in water. Under such conditions there is but one principal result in recharging, and that is the battery heating, with the result that the battery plates buckle which causes a shortening of the life of the insulation and also causes internal short circuits, which conditions necessitate repairs. Such repairs are at best unsatisfactory as the plates in the battery cannot be straightened without breaking. Whenever the plates are overheated their efficiency is lessened and this results in frequent recharging of the battery from some outside source.

Furthermore, excessive charging of the battery causes sloughing of the active material in the battery, thereby compelling the owner to buy a new battery long before such expense should be incurred if the above named injuries had been properly guarded against.

It is the object of this invention to govern or control at all times the amount of electric current passing into the battery, and this is accomplished by a thermostatic control of the temperature of the battery.

The charging may be regulated by directing a part of the current, after leaving the generator, to be absorbed by means of resistance placed in multiple or series with the charging line but still allowing a limited amount of current to go to the battery, or, since the overcharging of the battery may be controlled by reducing the output of the generator by cutting in a resistance in series with the shunt field of the generator. The automatic switch employed in this invention and as indicated, breaks the contact if the resistance is used in series and makes contact if the resistance is used in multiple.

The invention will be best understood from a consideration of the following detailed description taken in connection with the accompanying drawings forming part of this specification, with the understanding that the invention is not confined to any strict conformity to the showing of the drawings, but may be changed and modified so long as such changes and modifications mark no material departure from the salient features of the invention as expressed in the accompanying claims.

In the drawings:—

Figure 1 is a diagram of a generator and battery safety controller where the resistance is cut in, in series with the shunt field of the generator.

Figure 2 is a diagram similar to that shown in Figure 1, but with the resistance in series with the charging line of the battery.

Fig. 3 is a vertical cross section of an automatic switch employed in connection with the invention.

Fig. 4 is a vertical section as seen at right angles to the view shown in Fig. 3.

Fig. 5 is a horizontal section through the casing of the switch.

Fig. 6 is an inverted plan view of the structure illustrated in Fig. 5.

Fig. 7 is a section on the line 7—7 of Fig. 5.

Fig. 8 is a detail section on the line 8—8 of Fig. 5.

Fig. 9 is a detail section of a thermostatic control.

Fig. 10 is a section on the line 10—10 of Fig. 9.

Fig. 11 is a face view at right angles to the showing of Fig. 9.

Fig. 12 is a section on the line 12—12 of Fig. 9.

Fig. 13 is a plan view of a battery connector.

Fig. 14 is a section on the line 14—14 of Fig. 13.

Fig. 15 is a diagram of the controller where the resistance is connected to the charging line in multiple with the battery.

Referring first to Figures 1, 2 and 15, there are shown three diagrams of automatic generator and battery safety controller for installation upon an automobile or other vehicle of like character.

In Fig. 1 there is shown a generator 1, together with a circuit breaker 2 and an automatic switch 3, both the circuit breaker and automatic switch being in general of like construction whereby a description of the construction of one will in the most part apply to the other.

In practice, the circuit breaker 2 and the automatic switch 3 are mounted on a common base 4 (as in Figure 3) and are included under a common cover 5 having an interior insulating lining 6. The cover 5 may be formed of sheet metal pressed into shape to protect the part enclosed thereby from harmful contact and from dust and the like.

The base 4 is elevated above the support from which it rises by legs 7 and at one side the base has an extension or shelf carrying binding posts 9, 10, and 11 and on the other side there are projecting arms between which extend the sleeve of insulating material.

Mounted on and rising from base 4 within the cover 5 (as shown in Fig. 7) are two electromagnets 14 and 15 respectively. Each electromagnet 14 and 15 retains in place U-shaped polar extremities 16 and 17 respectively, retained in place by screws 18, the extremity 16 being somewhat longer than the extremity 17.

Carried by the extremity 17 is a continuation 19 which is electrically insulated from 17 and supports an arm with a contact point. The polar extension 16 is longer than the polar extension 17, and is provided with a pair of terminals 20 opposite the contact member 24.

These terminals being undercut as in 21, shown in Fig. 3, and receive between them an armature 22 as shown in Fig. 4, having the other end 23 (Fig. 7) associated with and overhanging contact point 24, serving as a limiting means for the movement of the corresponding end of the armature 22, as well as acting as a part of the electromagnetic switch.

Connected to but insulated from the armature 22 (Fig. 4) is a spring arm with the contact point used to relieve any possible strain on the thermostat and to eliminate arcing of the thermostatic points at the time they part as the battery cools, as will be explained in detail later.

The armature 22 is held up by means of a spring until such a time as the electromagnet 15 overpowers the spring 25, drawing down the armature 22, and in this case breaking the circuit between the armature 22 and the contact point at 24.

Connected to the base 4 (Fig. 6) is a detachable resistance unit, the ohmage resistance of which may be regulated to suit the particular car it is to be used on. This is done by means of a sliding contact cutting in or out part of the wire 13 or by removing the complete resistance unit and substituting another one with the proper resistance.

On the opposite side of the base 4 (Fig. 4) is a shelf riveted to the base and supporting the insulated terminals by means of which the controller is connected to the balance of the equipment.

In accordance with the invention, provision is made for the control of the current to the battery by heat generated in the battery. In order to affect this circuit, the arrangement shown in Figures 9 to 12, or the arrangement shown in the Figures 13 and 14 may be employed, the two arrangements illustrated being substantially identical in effect.

In Figure 9 there is shown a battery vent plug 48 which may be of insulating and acid proof material and arranged to screw into the cover of the storage battery 31. Carried by the plug 48 is a sleeve 49 which may be made of lead or other acid proof material so that it may be inserted in the electrolyte without harm thereto.

There is located a sheet 50 (Fig. 11) of insulating material, and inclosed in this sheet 50 is a thermostatic element 51 comprised of two terminals 52 and 53, one of which may be an elastic strip so arranged as to move into engagement with the other terminal 52 under the influence of heat.

Embodied in the terminal 52, is an adjusting screw on one end of which is a contact point, on the other end of which provision is made to connect one of the controlling wires leading to the electromagnet 15 (Fig. 1).

Attached to the thermostatic element 51 is the other controlling wire which is electrically connected directly or indirectly with the electromagnet 15. The connection of both these controlling wires at the controller is shown separately in Fig. 8 and also appears in others of the drawings.

By this means, the heat generated in the battery during charging will affect the thermostatic points, closing the thermostatic contact points and rupture the direct circuit, causing the current to be diverted across the resistance unit when the heat has reached a pre-determined limit and the circuit will again close when the temperature of the battery has dropped, but the rise in temperature will at no time reach a dangerous height.

In Figures 13 and 14 there is shown a somewhat different structure from that shown in Figures 9 to 12 inclusive. Storage batteries customarily have connectors between the elements of the battery and located on the top of the battery cells, such connectors being of the general type illustrated in Figures 13 and 14, and designated by the reference numeral 54.

Such connectors are provided with bridge sections 55, and when adapted for use in connection with the invention, such connecting bridge 55 is formed with an intermediate cut-out 56, deep enough to contain certain thermostatic structures.

The thermostats shown in Figures 13 and 14 consist of an elastic element 57 which may be in the form of a thin coiled strip of metal and a set screw terminal 58 adjustable with relation to the elastic strip.

The thermostatic elements 57 and 58 are appropriately insulated one from the other and provided with conductors 43 and 44, as shown in Fig. 1. The thermostatic elements are numbered 52 and 53 and are merely diagrammatically illustrated and may be representative of either of the structures of Figures 9 to 12, and Figures 13 to 14.

The thermostatic control is applied in different ways: First, by causing a part of the current after leaving the generator to be absorbed by means of resistance placed in series or multiple with the charging line, but still allowing a limited amount of current to continue to charge the battery. Second, it is the purpose to control the overcharging of the battery by reducing the out-put of the generator by cutting in a resistance in series with the shunt field of the generator. This requires a slight change in the connection for the automatic switch and the installation of another terminal, and other slight changes.

But while the second named controller is not exactly like the first named controller, the purpose and results of the structure are the same, and the two arrangements are shown in Figures 1 and 2 respectively.

In Figure 15 there is shown resistance contact 60 carried on the armature 22 and the other in the path thereof so as to provide for the reduction in the amount of current reaching the battery.

The automatic switch 15 breaks the contact if the resistance is used in series and makes contact if in multiple. In Fig. 1 there is shown the series generator control.

Normally, the current passing through the shunt field of the generator 40 is conducted over wire 39 to the terminal 38 thence on to over wire 39 to contact point 38 as designated in Fig. 1 across the contact points to the armature 22 to common terminal 34 thence over wire to 35 to terminal 10, then over wire 28 to one of the brushes of the generator which completes the shunt field circuit.

At such a time as the heat of the battery reaches a predetermined point closing the thermostatic points 52 and 53, causing a current to flow from common terminal 34 over wire 33 across contact points 23 and 24 of the automatic circuit breaker, then across the armature 22 through the U-shaped frame of the magnetic circuit breaker, thence through wire leading from and connected to this frame through the winding of the electro-magnet 15, then on through wire 44 across terminal 52 and 53 of the thermostat thence back over wire 43 to terminal 9, which like one terminal of the battery being grounded completes the circuit energizing electromagnet 15, drawing down armature 22, and breaking the contact designated at 38, causing resistance 37 to be thrown in series with the shunt field of the generator 40. There is further provided an additional contact fastened to, but insulated from the armature 22 which is electrically connected to a point 46 and the terminal 9 by wire 43.

As the armature 22 is drawn down by the electromagnet it closes contact points 45 and 46. Contact point 45 being connected to wire 44 leading from the electromagnet 15 to the thermostatic point 53.

As the path of least resistance is now across contact points 45 and 46, the current energizing the electromagnet 15 is diverted across contact points 45 and 46 and over wire 43 to terminal 9 and thence to ground relieving the thermostat of any possible strain which might be due to the continued passing of the current necessary to keep the electromagnet 15 energized.

It is further provided that in case an additional load upon the electrical system is created by the turning on of lights during the time that the charging rate has been cut down, due to the overheating of the battery, that upon turning on the tail light a part of the current passing to this tail light is diverted through terminal 11 by means of wire 42, which is connected at some convenient point to the tail light wire, leading to terminal 11 thence through electromagnet 14 to terminal 9, which being grounded completes this particular circuit, energizing electromagnet 14, breaking the circuit across contact points 23 and 24, demagnetizing electromagnet 15, completing the circuit across the points designated at 38 which cutting out the resistance connected in series with the shunt field of the generator and making a complete closed circuit of this shunt field, permits the generator to again produce its full out-put to take care of this additional load.

A tail-light and its circuit connections are indicated generally by the reference character 29$^b$ and includes a controlling switch 29$^a$. In Figures 1 and 2 of the drawings, the circuit connection 30 is illustrated as provided with a relay cut-out and in Figure 15 of the drawings the circuit connection 28 is also shown as provided with a relay cut-out. The said relay cut-out is indicated by the reference character 29.

The points of the thermostat are protected from arcing, due to the creating of what may be termed a second circuit of less resistance over which the current will flow instead of going through the thermostatic points. Such current will flow until the relay cut-out is opened or until the magnetic device or circuit breaker 14 has been energized, due to the turning on of the tail-light at or by the switch 29$^a$ and when said circuit breaker 14 is energized the contacts 23 and 24 will be opened.

The automatic circuit breaker 14 is employed to bring the charging rate to normal when an additional electric load is needed by reason of turning on the light, etc.

While the connections of the electromagnet 14 are changed in Fig. 15, its purpose remains the same, namely to provide a means by which the electrical system can take care of the additional load at any time that the lights may be turned on.

The connections shown in Fig. 2 vary with Fig. 1, only insomuch as the resistance is connected in series with the charging line instead of the shunt field of the generator and is used to absorb or retard the current after it has left the generator, but before it reaches the battery.

In Fig. 15 the variation in connections is only simplified insomuch as the resistance is now cut in in multiple with the battery and the path of least resistance up to the point for which the resistance unit is provided, is across this resistance and returning to the generator by means of the ground allows only a pre-determined amount of this current to continue to the battery after the battery has reached a pre-determined heat which will close the thermostatic contact points and cause the controller to automatically place the resistance unit in the circuit.

What is claimed is:—

1. In a battery charging system the combination with means to provide a main battery charging circuit including a normally closed switch and a magnetic device for actuating said switch to open said circuit, of means connected to said device to provide a normally opened thermostat strain relieving circuit of less resistance than the main circuit and including a normally open switch actuated by said device when energized to close the said circuit of less resistance, and means to provide an energizing circuit for said magnetic device and including a thermostatic switch actuated from the heat of the battery being charged to close said energizing circuit to create said circuit of less resistance to relieve the thermostatic switch of any possible strain which might be due to the continued passing of the energizing circuit for said magnetic device.

2. In a battery charging system the combination with means to provide a main battery charging circuit including a normally closed switch and a magnetic device for actuating said switch to open said circuit, of means connected to said device to provide a normally opened thermostat strain relieving circuit of less resistance than the main circuit and including a normally open switch actuated by said device when energized to close the said circuit of less resistance, means to provide an energizing circuit for said magnetic device and including a thermostatic switch actuated from the heat of the battery being charged to close said energizing circuit to create said circuit of less resistance to relieve the thermostatic switch of any possible strain which might be due to the continued passing of the energizing circuit for said magnetic device, an electro-magnetic circuit breaker including a normally closed switch and electrically connected with said magnetic device and constituting means when the switch forming an element thereof is opened to bring the battery charging rate to normal, and means to provide a normally opened energizing circuit for said electromagnetic circuit breaker and closed when a light is turned on to energize said breaker to open its switch, causing thereby the de-energizing of said magnetic device and the closing of the main circuit through its switch.

In testimony whereof, we affix our signatures hereto.

GEORGE E. ROCHE.
ALFRED H. WILLOUGHBY.